Nov. 1, 1966     A. POSNER ET AL     3,282,090
APPLANATION TONOMETER
Filed Dec. 23, 1963

INVENTORS
ADOLPH POSNER
RICHARD INGLIMA

BY Albert Jacobs

ATTORNEY

3,282,090
APPLANATION TONOMETER
Adolph Posner, New York, and Richard Inglima, Brooklyn, N.Y., assignors to Institute for Glaucoma Research, Inc., New York, N.Y., a corporation of New York
Filed Dec. 23, 1963, Ser. No. 332,541
6 Claims. (Cl. 73—80)

The present invention relates to the art of tonometry for the determination of the intraocular pressure of the human eye for test and diagnostic purposes and, more particularly, to an improved applanation tonometer having features and characteristics not heretofore available.

Tonometers have been known and used for some years in ophthalmology and the Maklakov tonometer has been known and used since about 1885. While the Maklakov tonometer has been generally satisfactory it has certain recognized drawbacks especially in that it cannot be sterilized and is lacking in sufficient accuracy. The Schiotz tonometer is also known but uses the principle of indentation rather than applanation. The applanation type of tonometer differs from the indentation type in that the resultant volume displacement of the former is much smaller than that produced by the latter so that measurements are less dependent upon variations in distensibility of the coats of the eyeball. This factor is of value in the diagnosis of borderline cases of glaucoma and in the detection of glaucoma among young myopic individuals whose eyeballs have an abnormally high degree of distensibility.

According to the present invention an applanation tonometer is provided which is readily sterilizable and which lends itself to unusually high precision of measurement of intraocular pressure as well as being unusually easy to manipulate. Other advantages will be apparent or understood from what follows.

Figure 1:
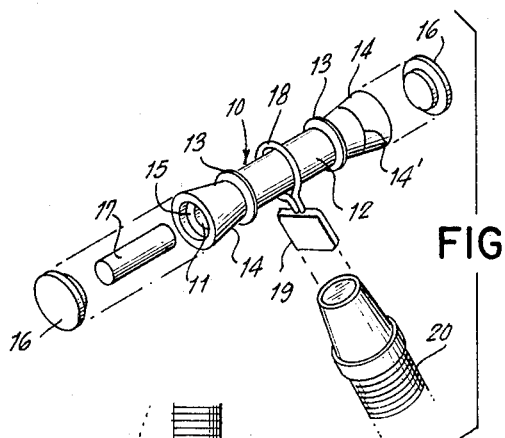
FIGURE 1 is an exploded perspective view of an applanation tonometer embodying the present invention.

The new applanation tonometer is made up of a hollow stainless steel body portion 10 of generally cylindrical shape and having a cylindrical cavity 11 extending therethrough. The central part 12 of the body portion is substantially a true cylinder and at either end of this part there is an annular rib 13. The ends of the body portion flare outwardly as shown at 14 and each of the end surfaces is provided with a recess 15 for the reception of footplates 16 which are composed of ceramic material such as Pyroceram, a material developed for use in nose cones of space rockets. Pyroceram has been found to be especially desirable for use in the present invention because it has zero expansion and contraction when subjected to temperature changes. It is also an extremely stable and permanent material. The footplates 16 are provided with thickened central portions so as to interfit with the recesses 15 in the ends of the body portion. These footplates are adhesively secured in position through the use of an epoxy resin adhesive known as an Epon resin made by Shell Chemical Company. Within the cavity 11 there is a cylindrical weight 17, constructed of definite but varying weights, which is unsecured and which therefore can move freely in response to positional variations of the body portion. A wire loop 18 encircles the central cylindrical part of the portion and terminates in a small plate 19 of magnetic material which is marked with indicia to designate the weight in grams and which is also provided with the letters R and L to designate "right" and "left."

It is understood that three tonometric units of the kind described are used as a set and that they are of 5, 7.5 and 10 gram weight. For convenience of use and to avoid possible confusion during use, the plates 19 are given different shapes. The tonometer unit illustrated has a plate 19 of rectangular shape and is the 7.5 gram unit, whereas the plate 19 of the 5 gram unit is of flattened circular shape and that of the 10 gram unit is of polygonal shape, i.e. hexagonal. It will also be observed that on the right-hand side the flaring end of the body portion is provided with a shallow annular groove 14' in order that it may be checked readily as to whether the tonometer is in the correct or desired position.

Figure 2:
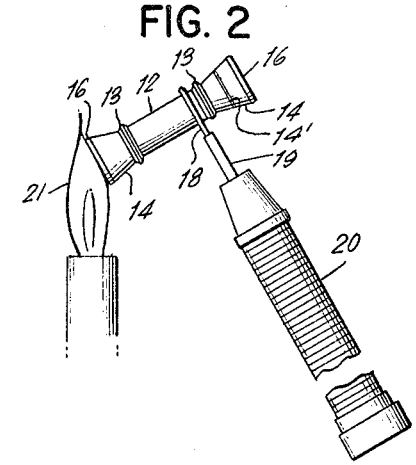
FIGURE 2 illustrates how the new tonometer is sterilized.
Figure 3:
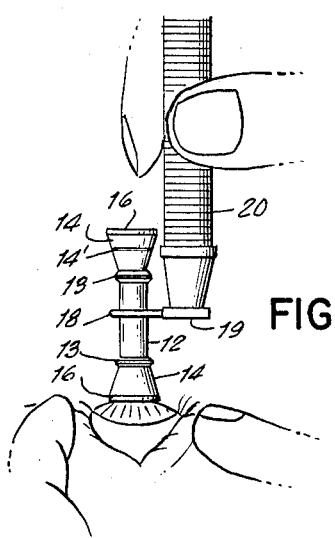
FIGURE 3 illustrates in side elevation the new tonometer during use in determining intraocular pressure.
Figure 4:
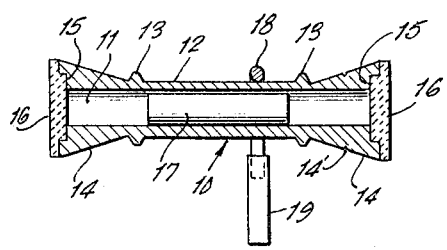
FIGURE 4 is a longitudinal sectional view taken through the new tonometer.
Figure 5:
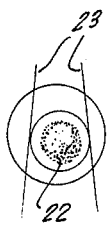
FIGURES 5 and 6 illustrate corneal imprints obtained by means of the present tonometer.
Figure 6:

A magnetized handle 20 is provided for picking up and manipulating each tonometer unit and is capable of being associated with each tonometer unit in either of two positions. In FIGURE 2 the magnetized handle 20 is in contact with the edge of plate 19 in order that the entire unit can be subjected readily to sterilization as in the flame of an alcohol lamp or other source of sterilizing heat designated at 21. After sterilization has been completed a stain is applied to each footplate 16, the outer surface of which is optically flat. The stain of choice is argyrol which is a well-known silver protein composition. The magnetized handle is then associated with the plate 19 in the manner shown in FIGURE 3 and the tonometer is lowered gently until a footplate rest on the cornea of the eye. At that time the loop 18 is manipulated so that the tonometer rests with its full weight on the cornea and the loop merely serves as a guide to prevent malpositioning of the tonometer. It will be apparent also that the annular ribs 13 serve to delimit longitudinal movement of loop 18 along the body portion and also to prevent disassembly. The tonometer in the position shown in FIGURE 3 is allowed to rest on the cornea for one-half to one second immediately following which it is lifted away from the cornea by the magnetized handle which is lifted into a position so that loop 18 contacts the upper rib 13 and upon visual inspection of the footplate which has been in contact with the cornea it will be seen that there is what may conveniently be called an eyeprint. This eyeprint consists of a central area 22 of a nature and diameter which depends on the intraocular pressure of the particular eye tested and the weight of the tonometer. The area 22 is thus a direct function of the degree of applanation. The area 22 is surrounded by unmodified or unchanged argyrol, thus delineating clearly the result of the test. The impression on the optically flat surface of the footplate can then be transferred to moistened paper or other suitable material to form a record for the particular patient. The significance of the recorded impression or of the impression on the footplate is interpreted by means of a special conversion scale graphically portrayed in part by the lines 23 which form a part of such conversion scale and the exact nature of which is not a part per se of the present invention.

It will be understood further that both the right eye and the left eye are so tested and it is usually desirable to repeat these tests for the other two weights tonometer so that a patient record can be produced bearing three sets of imprints. These tests are repeated at intervals in order to provide a running record for the particular patient in order that the ophthalmologist can observe intraocular pressure changes over a period of time and thus learn whether the patient is responding to any required treatment and is improving or deteriorating with respect to intraocular pressure.

The present tonometer and system of testing thereby provided enables the ophthalmologist to obtain a precise and accurate determination of the condition of the eyes of each patient and is especially valuable for diagnostic purposes because it is thus made possible not only to learn whether a particular patient has abnormally high intraocular pressure, which is a definite indication of the existence of glaucoma, but also makes it possible to spot incipient glaucoma and propressive changes in intraocular pressure. The invention is thus very valuable in that it is capable of saving sight or enabling treatment to be started to normalize abnormal eyes.

What is claimed is:

1. An application tonometer comprising a hollow stainless steel body portion of generally cylindrical shape, an optically flat footplate of ceramic material adhesively secured to each end of the hollow body portion and closing the ends of the cylindrical cavity therein, a cylindrical weight freely movable in said cavity, a wire loop disposed around the central part of the body portion terminating in an indicia-bearing plate of magnetic material, said wire loop and plate being constructed so as to permit peripheral clearance between said body portion and said wire loop, said wire loop being limited in its movement relative to said body portion by a pair of spaced annular ribs formed on said body portion, said plate being magnetically coupled to a handle in a plurality of different positions one of which enables the entire tonometer to be sterilized and another of which is for the application of the footplates to the corneas of human eyes to be examined for the determination of intraocular pressure.

2. An applanation tonometer according to claim 1, in which the ceramic material is pyroceram.

3. An applanation tonometer according to claim 1, in which the adhesive is an epoxy resin.

4. An applanation tonometer according to claim 1, in which the footplates have portions of reduced diameter on their underside fitting into complementary recesses in the ends of the body portion.

5. An applanation tonometer according to claim 1, in which the body portion is cylindrical between the annular ribs and flares at its ends.

6. An applanation tonometer according to claim 1, in which each footplate has stain applied thereto to receive a transferable impression from the cornea for indicating the amount of corneal flattening.

References Cited by the Examiner

UNITED STATES PATENTS

| 2,780,221 | 2/1957 | Posner | 128—2 |
| 3,049,001 | 8/1962 | Mackey et al. | 73—80 |
| 3,070,997 | 1/1963 | Papritz et al. | 73—80 |

OTHER REFERENCES

Goldmann, H.: Un Nouveau Tonometre A Applanation. In Bulletin et Memoires de L'Societe Francaise d'Opththalmologie 67; 1955, pp. 474–478.

Goldmann, H. and Schmidt, T.: Uber Applanation Stonometrie. In Ophthalmologica, 134(4), pages 221–242, October 1957.

RICHARD C. QUEISSER, *Primary Examiner.*

J. JOSEPH SMITH, Jr., *Assistant Examiner.*